(12) United States Patent
Calello (10) Patent No.: US 9,533,788 B2
(45) Date of Patent: Jan. 3, 2017

(54) LIGHTWEIGHT PREFORM HAVING A DECREASED WEIGHT SUPPORT RING

(71) Applicant: Patrick Michael Calello, Roseland, NJ (US)

(72) Inventor: Patrick Michael Calello, Roseland, NJ (US)

( * ) Notice: Subject to any disclaimer, the term of this patent is extended or adjusted under 35 U.S.C. 154(b) by 0 days.

(21) Appl. No.: 13/916,183

(22) Filed: Jun. 12, 2013

(65) Prior Publication Data

US 2013/0330490 A1 Dec. 12, 2013

Related U.S. Application Data

(60) Provisional application No. 61/689,790, filed on Jun. 12, 2012.

(51) Int. Cl.
| | |
|---|---|
| *B29B 11/14* | (2006.01) |
| *B65D 1/02* | (2006.01) |
| *B29K 67/00* | (2006.01) |
| *B29C 49/00* | (2006.01) |
| *B29C 49/06* | (2006.01) |

(52) U.S. Cl.
CPC ............. *B65D 1/0246* (2013.01); *B29B 11/14* (2013.01); *B29B 2911/1402* (2013.01); *B29B 2911/1404* (2013.01); *B29B 2911/14026* (2013.01); *B29B 2911/14033* (2013.01); *B29B 2911/14326* (2013.01); *B29B 2911/14446* (2013.01); *B29B 2911/14473* (2013.01); *B29C 49/0073* (2013.01); *B29C 49/06* (2013.01); *B29C 2793/009* (2013.01); *B29C 2793/0027* (2013.01); *B29C 2795/002* (2013.01); *B29K 2067/003* (2013.01);

(Continued)

(58) Field of Classification Search
CPC .. B65D 1/0246; Y10T 428/1352; B29B 11/14; B29B 11/16; B29C 49/0073
USPC ................ 428/35.7, 36.5–36.7, 36.92, 542.8
See application file for complete search history.

(56) References Cited

U.S. PATENT DOCUMENTS

| 7,028,857 B2 | 4/2006 | Peronek |
|---|---|---|
| 7,681,749 B2 | 3/2010 | Peronek |
| (Continued) | | |

FOREIGN PATENT DOCUMENTS

| JP | 2003112716 A | 4/2003 |
|---|---|---|
| KR | 1020080062070 A | 7/2008 |

OTHER PUBLICATIONS

PCT/US2013/04540 Written Opinion of the International Searching Authority and International Search Report, Jan. 28, 2014.

*Primary Examiner* — Walter B Aughenbaugh
(74) *Attorney, Agent, or Firm* — Clinton H. Wilkinson; Charles A. Wilkinson (57) ABSTRACT

A lightweight polyester preform is disclosed for the production of light weight polyester containers by blow molding. The preforms and the resulting blown containers have threads on an exterior surface adjacent an upper end. Adjacent to and located below the threads is a support ring. The support ring is used in handling and conveying a preform from injection molding to a blow mold and in blow molding the container from the preform. It also is used in handling and conveying the preform from storage to the blow mold. To lightweight the preform, and subsequent container, the support ring is designed to have a minimum weight, but a sufficient strength for the handling of the preform in the production of the blow molded container. The support ring is reduced in weight by about 10% to about 70% from a conventional preform support ring.

20 Claims, 6 Drawing Sheets

(52) U.S. Cl.
CPC ..... *Y10T 428/1352* (2015.01); *Y10T 428/1376* (2015.01)

(56) References Cited

U.S. PATENT DOCUMENTS

| | | | |
|---|---|---|---|
| 7,976,767 B2 | 7/2011 | Ungrady et al. | |
| 8,544,663 B2* | 10/2013 | Barel et al. | 215/40 |
| 8,815,356 B2* | 8/2014 | Huettner | B29C 45/372 428/35.7 |
| 2001/0055632 A1* | 12/2001 | Semersky | 425/525 |
| 2004/0238475 A1 | 12/2004 | Peronek | |
| 2006/0201903 A1 | 9/2006 | Peronek | |
| 2007/0210026 A1 | 9/2007 | Darr et al. | |
| 2010/0098894 A1 | 4/2010 | Shi et al. | |
| 2010/0116771 A1 | 5/2010 | Cerveny | |
| 2010/0243597 A1* | 9/2010 | Nemoto | B29C 49/48 215/40 |
| 2011/0100946 A1 | 5/2011 | Perra | |

\* cited by examiner

LIGHTWEIGHT PREFORM HAVING A DECREASED WEIGHT SUPPORT RING

CROSS-REFERENCE TO RELATED APPLICATIONS

This application claims the benefit of U.S. Application 61/689,790 filed Jun. 12, 2012, the contents of which are incorporated by reference herein.

FIELD OF THE INVENTION

The present invention is directed to light weight preforms for the production of blow molded containers. More particularly, the invention is directed primarily to polyester container preforms where a part of the lightweight structure is a preform support ring of a decreased weight and a polyester material. The preform support rings have a structure which is solely sufficient to support the preform through handling and the blow molding of the preform to the container and subsequently handling the container through the use of a minimum amount of polyester material.

BACKGROUND

There is an interest in producing containers with as low a weight as reasonably possible. An economic reason is to save on the amount of structural material in a container. This lowers the cost of the container and the overall cost of the product in the container. There additionally is a companion interest in using lightweight closures. In many countries there also is an ecological advantage in that an ecological tax is levied on the material content of a container and closure. Consequently, there is considerable attention given to the issue of container weight and the associated closure. They are designed to minimize weight thus costs. The extra weight in a blow molded container will usually be in the base and in the neck finish. The base must be sufficiently strong to support the filled container throughout filling, shipping and use. This includes the stacking of the containers whether within stacked cartons or stacked as individual containers. This is more so the case for containers for carbonated beverages. The neck finish must be sufficiently strong to withstand the filling and capping operations as well as subsequent shipping and use. This issue of decreasing the weight of blow molded containers has been approached in various ways.

In U.S. Pat. No. 7,976,767 the preform is light weighted through the use of thinned neck finish areas that are molded into the preform at the time of injection molding the preform. The thicker areas will be sufficiently strong to provide a sufficient strength to the overall neck finish. This will compensate for a lack of strength in the thinned areas. U.S. Pat. No. 7,708,159 is directed to making containers with a lower center of gravity. This is accomplished by reducing the weight of the neck portion by decreasing its height and by making the tamper evident bead discontinuous. The primary objective is to lightweight the container. In U.S. Pat. No. 7,279,207 the container is light weighted by the container not having a neck finish to be sealed with a threaded closure, but rather by a flat seal, such as a foil seal. This significantly decreases the height of the neck finish and thus the weight of the container. However, such a container could not be used for carbonated beverages and in other uses where a substantial closure is needed. In US 2010/0116771 the increased light weight technique is to decrease the dimension of the neck sufficient to attach a closure using the support ring as a part of the tamper evident closure structure. This requires strengthening the support ring but may lower material content of the neck/spout. This will add weight to the support ring. In US 2011/0100946 a polyester container is light weighted by utilizing internal threads in order to decrease the linear dimension of the neck. There is a support ring that is used for the conventional purpose of handling the preform through the container blow molding process and the subsequent use of the support ring as a part of the container closure. When used as a part of the container closure the support ring in whole or in part secures the closure onto the container neck. This requires that the support ring have an added strength in order to provide for the two functions. It must be sufficient to support the preform through the blow molding process and when it is being removed from the mold as well as assist in sealing the container. Additionally, utilizing this technique closures threaded onto the exterior of the neck finish cannot be used. This includes the containers commonly used in the carbonated beverage industry, one of the larger users of blow molded containers.

SUMMARY

The present invention is directed to reducing the amount of material in the support ring of the preform and thus of the resulting container. The support ring is engineered to dimensions and strength to handle the preform through the container blow molding process, but is not of dimensions and strength for other purposes such as to additionally be used as a part of the technique to close the container. That would require different dimensions and additional material. In the present invention the material of the support ring is reduced about 10% to about 70% from the support rings on various prior art containers. The total savings for the preform will depend also on other parts of the preform. This will include the thickness of the base portion and other parts of the finished container. Thus the only clear way to look at additional weight savings is through the weight savings of the preform alone.

The invention comprises a lightweight thermoplastic preform for the production of lightweight thermoplastic containers comprising an elongated thermoplastic body having an open end and a closed end, the open end having an opening defined by a sidewall of the thermoplastic body, threads on an exterior surface of the sidewall adjacent the open end, a support surface located below the threads, the support surface extending a distance from the sidewall, the support surface having defined dimensions whereby the weight of the preform can be reduced about 10% to about 70% utilizing the defined dimensions.

The defined dimensions of the support ring surface for the lightweight thermoplastic container can include a varied thickness of the support ring surface, a varied width of the support ring surface, a discontinuity of the support ring surface and void regions in the support ring surface. There also can be a combined utilization of one or more of a varied thickness, a varied width, discontinuity and void regions. This will reduce the material content and thus the weight of the support ring surface.

When the defined dimensions include a support ring surface with a varied thickness there can be reinforcing segments on a lower surface of the support ring surface, on the upper surface of the support ring surface, or on both the lower and the upper surfaces of the support ring surface. In addition the reinforcing segments can comprise information such as a logo, product name or information as to the opening of the associated container or as to use of the product in the container.

The lightweight thermoplastic preform can have an elongated thermoplastic body that is generally cylindrical having a circular cross-section or a polygonal cross-section of three or more sides. The threads are for the attachment of a closure to a container formed from the preform.

The lightweight thermoplastic preform preferably is comprised of a polyester, a preferred polyester being a polyethylene terephthalate.

DETAILED DESCRIPTION OF THE INVENTION

The invention will now be described in more detail in its preferred embodiments with reference to the attached drawings. The described invention is susceptible to modifications with regard to specific uses, but all such modifications will be obvious and will be considered to be within the concepts of the presently described embodiments.

Figures 1, 2, 3:
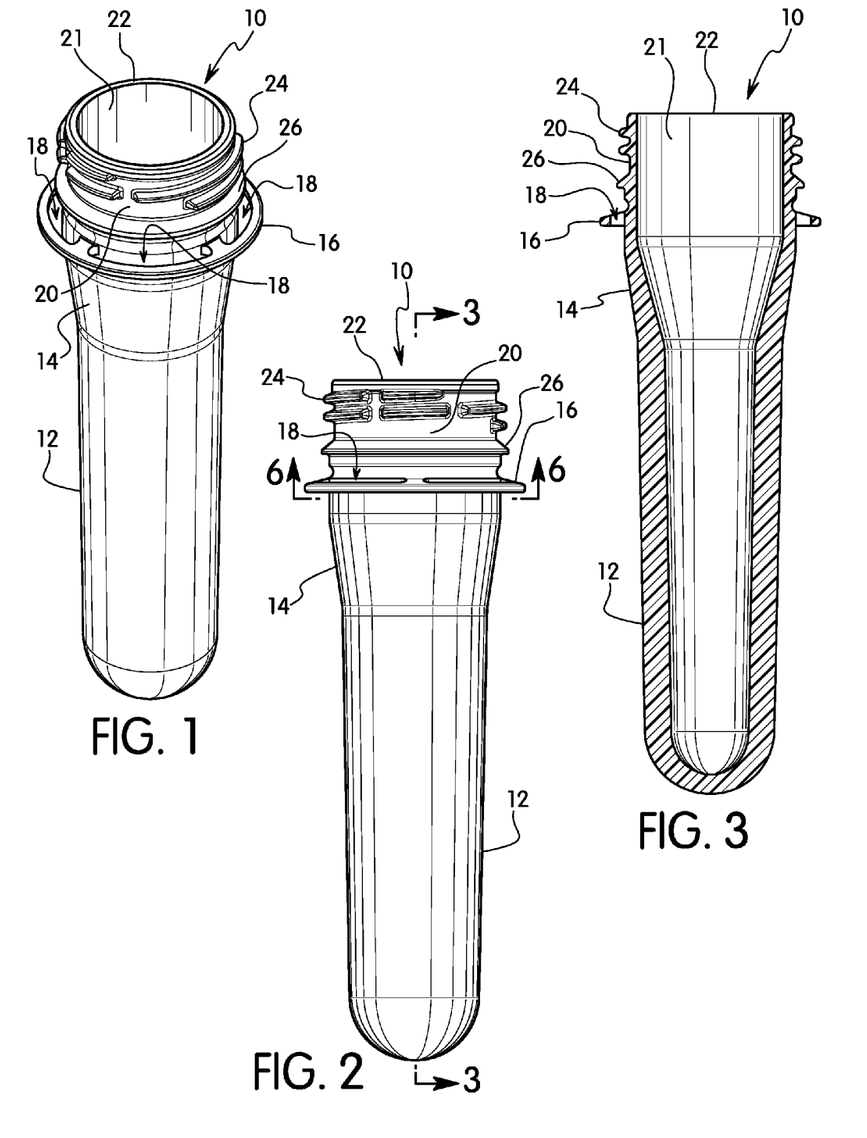
FIG. 1 is a perspective view of a preform with a lower elongated body, an open upper end, threads adjacent the open upper end and a support ring below the threads, the support ring containing voids.
FIG. 2 is a side elevation view of the preform of FIG. 1.
FIG. 3 is a vertical cross-section of the preform of FIG. 1 along line 3-3 in FIG. 3.

FIGS. 1 to 6 show the first embodiment of the light weight preform. FIG. 1 is a perspective view of the preform 10, FIG. 2 a side elevation view of the preform 10 and FIG. 3 a longitudinal cross-section of the preform 10. The preform 10 is comprised of a body 12, a shoulder 14 and a neck portion 20 with threads 24 for attaching a closure when the preform is blown into a container. The preform neck portion 20 has a top rim 22 and an interior surface 21. The neck finish includes the threads 24. Below the threads 24 are a sealing ring 26 and a support ring 16. The sealing ring can provide for a seal between the closure for the resulting container. The support ring has the purpose of supporting the preform after being formed usually by injection molding and during removal from the injection molding process and during subsequent conveying and handling while being transported to and inserted into a blow mold. In the blow mold the preform is heated and a high pressure gas is blown into the preform to stretch it to the internal shape of the mold 10 portion of the blow mold. The preform support ring 16 is shown having void spaces 18 to reduce the weight of the support ring, but yet maintain sufficient strength in handling the preform in the blow molding of the preform to the container.

Figure 4:
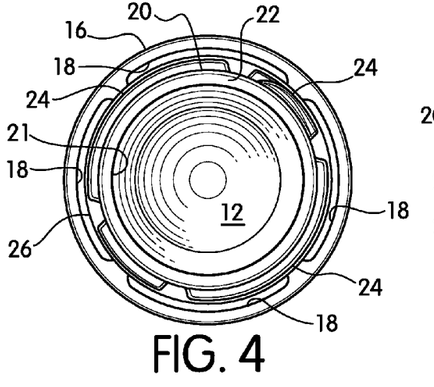
FIG. 4 is a top plan view of the preform of FIG. 1.
Figure 5:
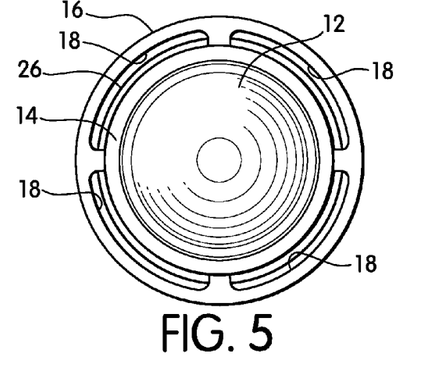
FIG. 5 is a bottom plan view of the preform of FIG. 1.
Figure 6:
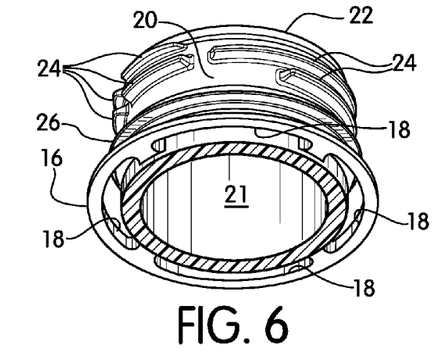
FIG. 6 is a cross-section view of the upper part of the preform of FIG. 2 along line 6-6 of FIG. 2.

FIGS. 4 to 6 show primarily the upper part of the preform 10 of FIG. 1 in more detail. This primarily is the neck portion 20. FIG. 4 is a top plan view, which in addition to showing the body 12, shows the support ring 16 with void spaces 18 to thus light weight the support ring. The void spaces 18 will decrease the weight of the support rings by up to about 42%. Also shown are threads 24 and portions of seal ring 26 in spaces between the threads. FIG. 5 is a bottom plan view which shows the body 12, support ring 16 with void spaces 18 and the seal ring 26. FIG. 6 is a perspective view of the neck portion 20 of the preform 10 showing the interior surface 21, upper edge 22, threads 24, the seal ring 26 and the support ring 16 with void spaces 18.

Figure 7:
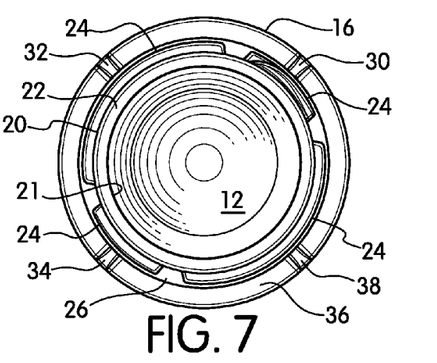
FIG. 7 is a top plan view of a first alternate embodiment of the preform of FIG. 1 where there is a plurality of support ring reinforcements on an upper surface of the support surface.
Figure 8:
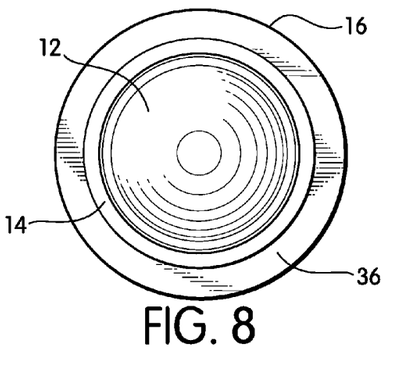
FIG. 8 is a bottom plan view of the preform of FIG. 7.
Figure 9:
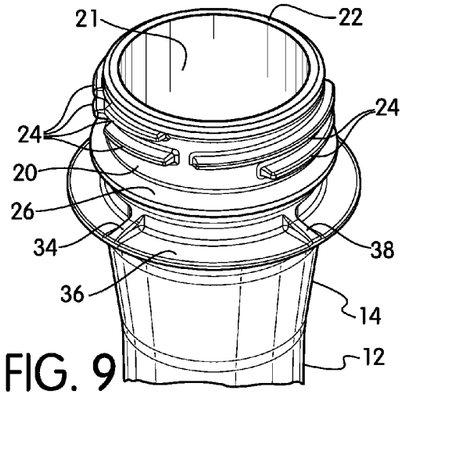
FIG. 9 is a perspective view of the upper portion of the preform of FIG. 7.

FIGS. 7 to 9 disclose a first alternate embodiment of the preform 10. The body of the preform 10 is the same as in FIGS. 1 to 3. FIG. 7 shows a top plan view of the first alternate embodiment, FIG. 8 a bottom plan view, and FIG. 9 a perspective view of the upper portion of the preform 10. In these views there is shown the neck portion which remains part 20, the threads 24, the seal ring 26, the upper edge 22 and the inner surface 21. The support ring is 36 with upper supports 30, 32, 34, and 38. The support ring has a weight of up to about 55% less than a usual support ring. Also shown in this view is the upper portion of body 12 and the shoulder 14 of the preform 10.

Figure 10:
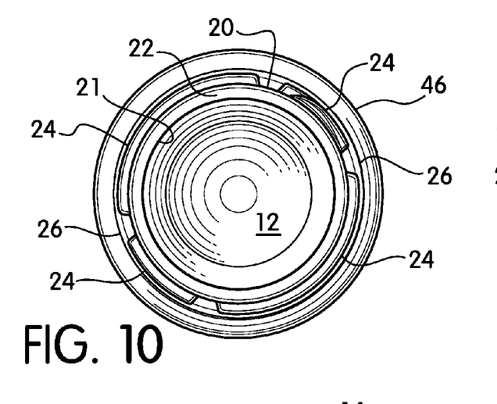
FIG. 10 is a top plan view of a second alternate embodiment of the preform of FIG. 1 where there is a plurality of support ring reinforcements on a lower surface of the support surface.
Figure 11:
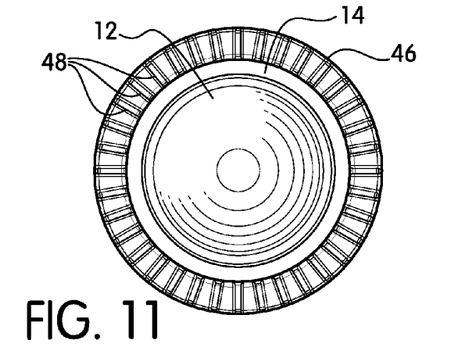
FIG. 11 is a bottom plan view of the preform of FIG. 10.
Figure 12:
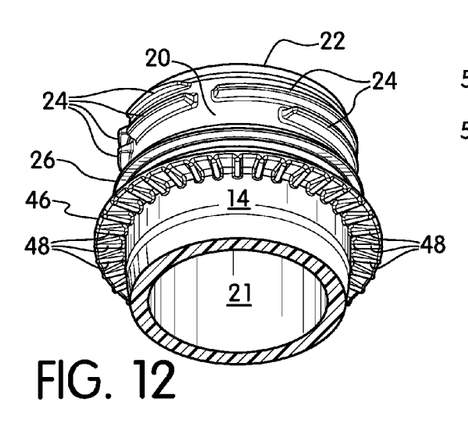
FIG. 12 is a perspective view of the upper portion of the preform of FIG. 10.

FIGS. 10 to 12 disclose a second alternate embodiment of the preform 10. The body 12 of the preform 10 is the same as in FIGS. 1 to 3. FIG. 10 shows a top plan view of the second alternate embodiment, FIG. 11 a bottom plan view, and FIG. 12 a perspective view of the upper portion of the preform 10 of the second alternate embodiment. In these views there is shown the neck portion 20, the threads 24, the seal ring 26, the upper neck edge 22 and the inner surface 21 of the neck portion 20. The support ring is 46 with a plurality of lower supports 48. Although there is shown a large number of supports 48 these can range from about four to the number shown in FIGS. 10 to 12. This support ring 46 has a weight of up to about 45% less than a usual support ring. Also shown in this view is the upper part of body 12 and the shoulder 14 of the preform 10.

Figure 13:
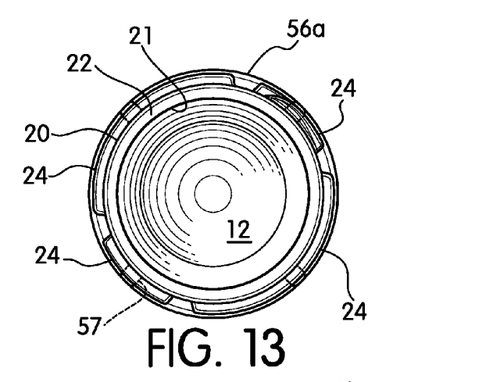
FIG. 13 is a top plan view of a third alternate embodiment of the preform of FIG. 1 where the support ring is comprised of disc sections attached at given points.
Figure 14:
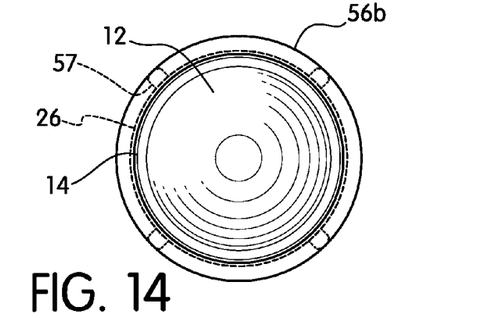
FIG. 14 is a bottom plan view of the preform of FIG. 13.
Figure 15:
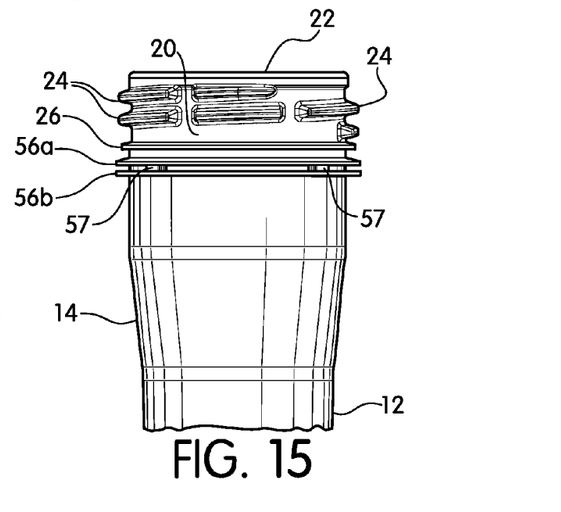
FIG. 15 is a side elevation view of the upper portion of the preform of FIG. 13.

FIGS. 13 to 15 disclose a third alternate embodiment of the preform 10. The body of the preform 10 is the same as in FIGS. 1 to 3. FIG. 13 shows a top plan view of the third alternate embodiment, FIG. 14 a bottom plan view, and FIG. 15 a perspective view of the upper portion of the preform 10. In these views there is shown the neck portion 20, the threads 24, the seal ring 26, the neck upper edge 22 and the neck inner surface 21. The support ring 56 is comprised of two disc sections attached at given points. These are sections 56a and 56b attached at connectors 57. The support ring 56a/56b can have a weight of up to about 43% of that of a usual support ring. Also shown in the FIG. 15 view is the upper part of body 12 and the shoulder 14 of the third alternate embodiment of preform 10.

Figure 16:
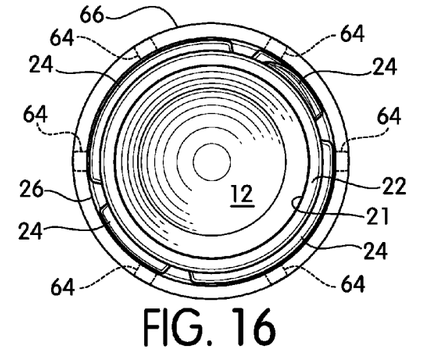
FIG. 16 is a top plan view of a fourth alternate embodiment of the preform of FIG. 1 where the support ring is reinforced by a plurality of lower supports.
Figure 17:
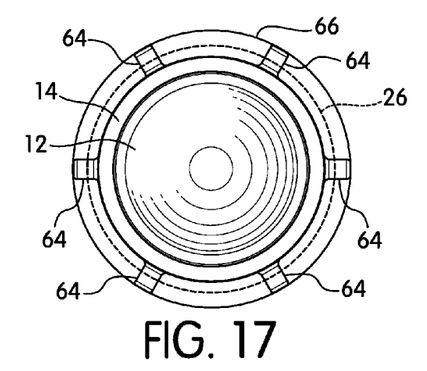
FIG. 17 is a bottom plan view of the preform of FIG. 16.
Figures 18, 21:
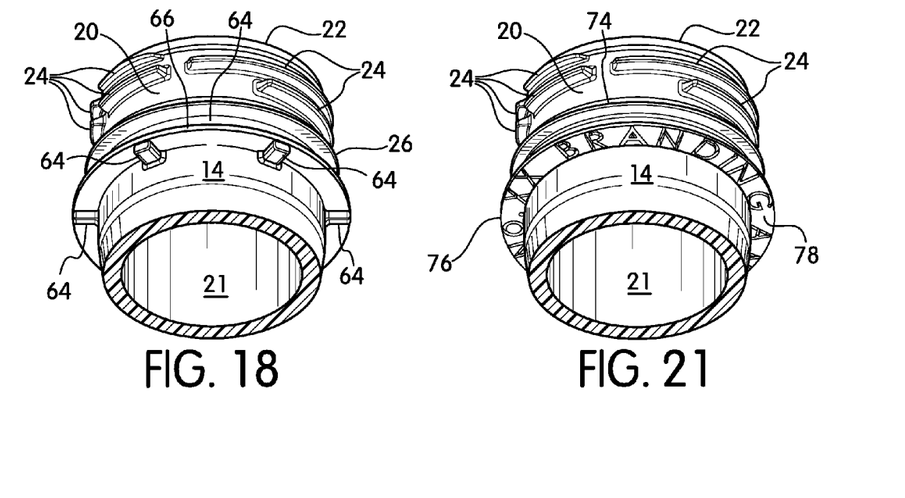
FIG. 18 is a perspective view of the upper portion of the preform of FIG. 16.
FIG. 21 is a perspective view of the upper portion of the preform of FIG. 19.

FIGS. 16 to 18 disclose a fourth alternate embodiment of the preform 10. The body of the preform 10 is the same as in FIGS. 1 to 3. FIG. 16 shows a top plan view of the fourth alternate embodiment, FIG. 17 a bottom plan view, and FIG. 18 a perspective view of the upper portion of the fourth alternate embodiment of preform 10. In these views there is shown the neck portion of the preform 10, the threads 24, the seal ring 26, the neck upper edge 22 and the neck inner surface 21. The support ring 66 is comprised of a disc supported by a plurality of lower supports 64. Although there is shown seven supports these can be fewer than seven supports and more than seven supports. This support ring structure has a weight of up to about 64% less than a usual support ring. Also shown in FIG. 18 is the upper part of body 12 and the shoulder 14 of the fourth alternate embodiment preform 10.

Figure 19:
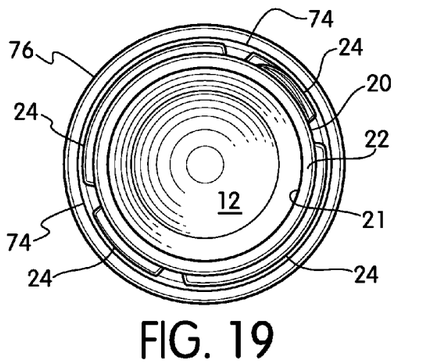
FIG. 19 is a top plan view of a fifth alternate embodiment of the preform of FIG. 1 where the support ring is reinforced with an embossed message.
Figure 20:
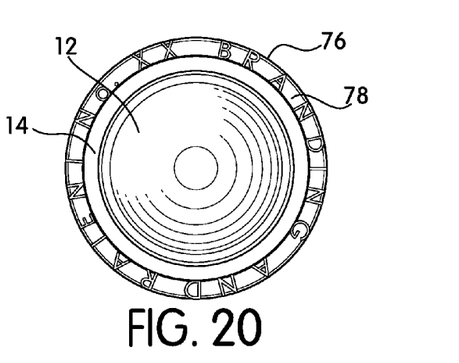
FIG. 20 is a bottom plan view of the preform of FIG. 19.

FIGS. 19 to 21 disclose a fifth alternate embodiment of the preform 10. The body of this fifth alternate embodiment of preform 10 is the same as in FIGS. 1 to 3. FIG. 19 shows a top plan view of the fifth alternate embodiment, FIG. 20 a bottom plan view, and FIG. 21 a perspective view of the upper portion of the fifth alternate embodiment of preform 10. In these views there is shown the neck portion which remains part 20, the threads 24, the seal ring 26, the neck upper edge 22 and the neck inner surface 21. The support ring is 76 with a plurality of reinforcing letters 78 on a lower surface. The reinforcing letters 78 are molded into the support ring 76 at the time of forming the preform. The letters also can be embossed into the support ring. In addition the letters can be on the upper surface of the support ring 76. The lettering can be a brand name or some form of advertising. The support ring 76 has a weight of up to about 11% less than a usual support ring. Also shown in FIG. 21 is the upper part of body 12 and the shoulder 14 of the fifth alternate embodiment of preform 10.

Figure 22:
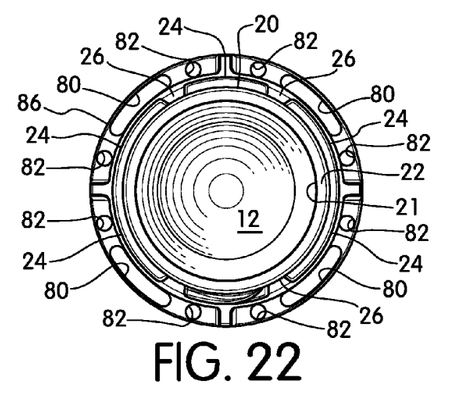
FIG. 22 is a top plan view of a sixth alternate embodiment of the preform of FIG. 1 where the support ring contains a plurality of voids.
Figure 23:
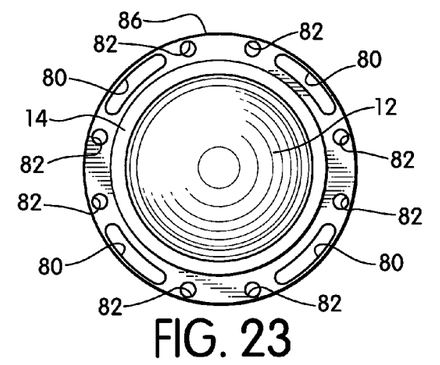
FIG. 23 is a bottom plan view of the preform of FIG. 22.
Figure 24:
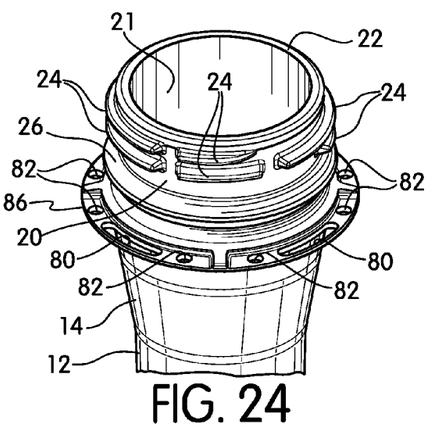
FIG. 24 is a perspective view of the upper portion of the preform of FIG. 22.

FIGS. 22 to 24 disclose a sixth alternate embodiment of the preform 10. The body of the sixth alternate embodiment of preform 10 is the same as in FIGS. 1 to 3. FIG. 22 shows a top plan view of the sixth alternate embodiment, FIG. 23 a bottom plan view, and FIG. 24 a perspective view of the upper portion of the sixth alternate embodiment of preform 10. In these views there is shown the neck portion 20, the threads 24, the seal ring 26, the neck upper edge 22 and the neck inner surface 21. The support ring 86 has a plurality of circular voids 82 and elongated voids 80. This mix of voids serves to strengthen the support ring. Although there is shown a large number of voids 80 and 82 these voids can range from about four to the number shown in FIGS. 22 to 24 or more. The support ring has a weight reduction of up to about 42% less than a usual support ring. This is related to the weight reduction of the embodiment of FIGS. 1 to 6. Also shown in FIG. 24 is the upper part of body 12 and the shoulder 14 of the preform 10.

Figure 25:
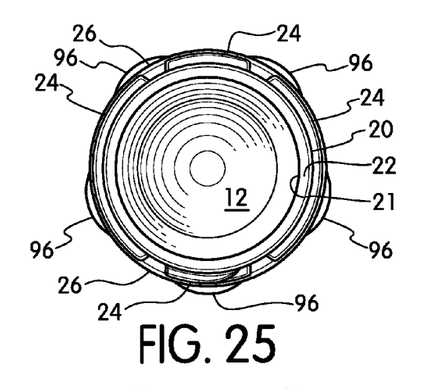
FIG. 25 is a top plan view of a seventh alternate embodiment of the preform of FIG. 1 where the support ring has a varied width.
Figure 26:
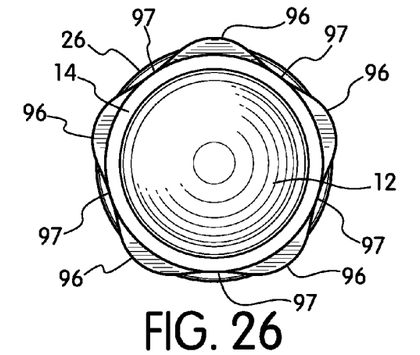
FIG. 26 is a bottom plan view of the preform of FIG. 25.
Figure 27:
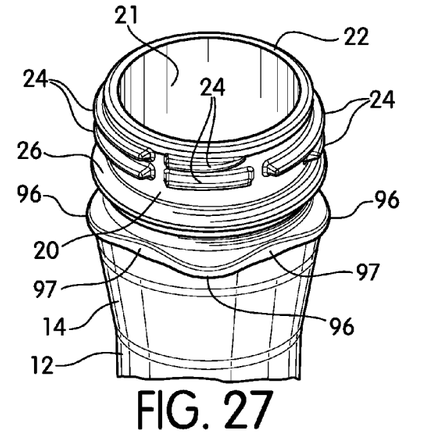
FIG. 27 is a perspective view of the upper portion of the preform of FIG. 25.

FIGS. 25 to 27 disclose a seventh alternate embodiment of the preform 10. The body of this seventh alternate embodiment of preform 10 is the same as in FIGS. 1 to 3. FIG. 25 shows a top plan view of the seventh alternate embodiment, FIG. 26 a bottom plan view, and FIG. 27 a perspective view of the upper portion of the seventh alternate embodiment of preform 10. In these views there is shown the neck portion which remains part 20, the threads 24, the seal ring 26, the neck upper edge 22 and the neck inner surface 21. The support ring 96 has a plurality of narrow width portions 97. The varied width provides for the integrity of the support ring 96 to functionally support the perform 10 during subsequent processing to blow mold a container. Although there are shown five wide portions and five portions 97 of decreased width, these portions can range from about three wide and decreased width portions up to ten or more of each. Also there need not be the same number of wide and decreased width portions. As the number of wide and decreased width portions increase the support ring 96 will approach a circle. The support ring 96 has a weight of about 36% less than a usual support ring. Also shown in FIG. 27 is the upper part of body 12 and the shoulder 14 of the preform 10.

Figure 28:
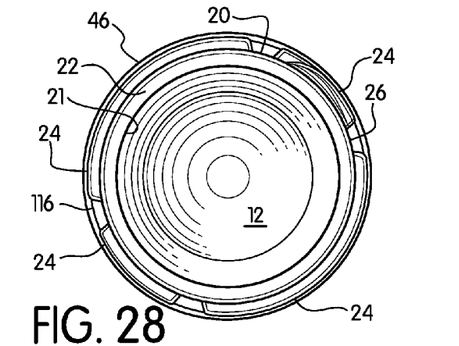
FIG. 28 is a top plan view of an eighth alternate embodiment of the preform of FIG. 1 where the 15 support ring has an L-shape.
Figure 29:
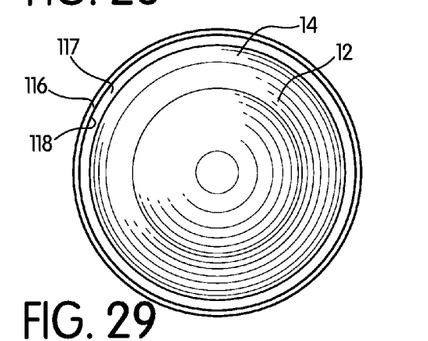
FIG. 29 is a bottom plan view of the preform of FIG. 28.
Figures 30, 30A, 33:
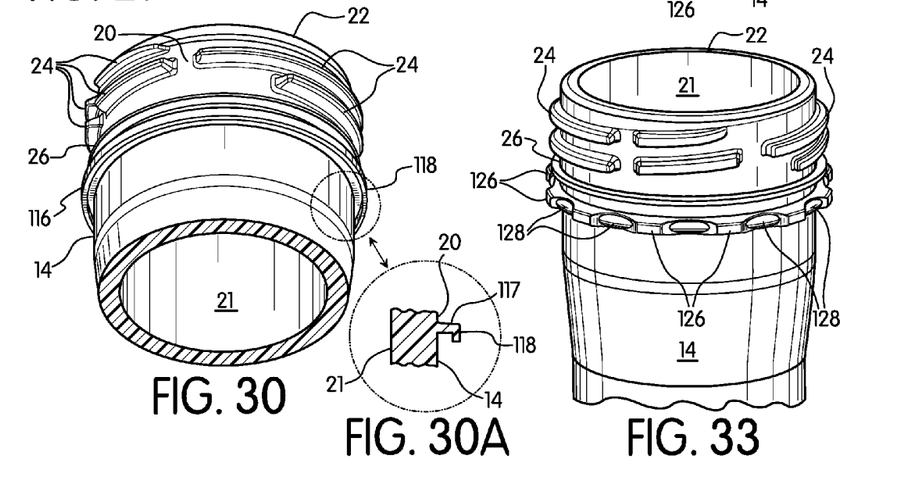
FIG. 30 is a perspective view of the upper portion of the preform of FIG. 28.
FIG. 30A is a cross-section of the support ring of FIG. 28.
FIG. 33 is a perspective view of the upper portion of the preform of FIG. 31.

FIGS. 28 to 30 disclose an eighth alternate embodiment of the preform 10. The body of this eighth alternate embodiment of preform 10 is the same as in FIGS. 1 to 3. FIG. 28 shows a top plan view of the eighth alternate embodiment, FIG. 29 a bottom plan view, and FIG. 30 a perspective view of the upper portion of the eighth alternate embodiment of preform 10. In these views there is shown the neck portion which remains part 20, the threads 24, the seal ring 26, the neck upper edge 22 and the neck inner surface 21. The support ring is 116 has an L-shape as shown in a partial cross-section in FIG. 30A. The L-shape has a top surface of 117 and a side surface of 118. The support ring 116 has a weight of up to about 36% less than a usual support ring. Also shown in FIG. 29 is the upper part of body 12 and the shoulder 14 of the eighth alternate embodiment of preform 10.

Figure 31:
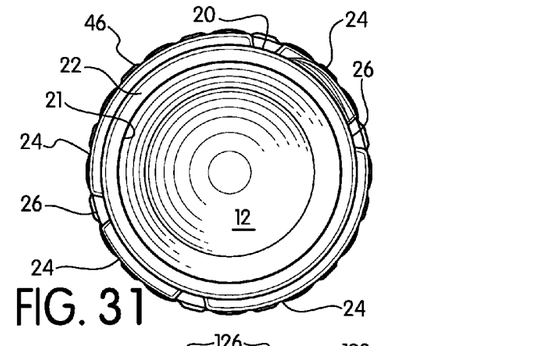
FIG. 31 is a top plan view of a ninth alternate embodiment of the preform of FIG. 1 where the support ring has support segments.
Figure 32:
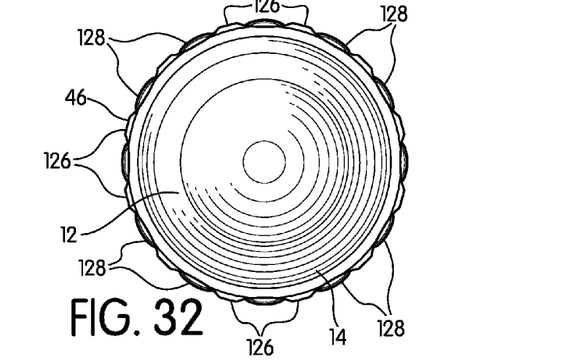
FIG. 32 is a bottom plan view of the preform of FIG. 31.

FIGS. 31 to 33 disclose a ninth alternate embodiment of the preform 10. The body of the ninth alternate embodiment of preform 10 is the same as in FIGS. 1 to 3. FIG. 31 shows a top plan view of the ninth alternate embodiment, FIG. 32 a bottom plan view, and FIG. 33 a perspective view of the upper portion of the ninth alternate embodiment of preform 10. In these views there is shown the neck portion 20, the threads 24, the seal ring 26, the neck upper edge 22 and the neck inner surface 21. The support ring is 126 has a plurality of support nodes 128. This mix of nodes 128 serves to strengthen the support ring. Although there is shown a large number of nodes these nodes can range from about three to the number shown in FIGS. 31 to 33 or more. The support ring has a weight reduction of up to about 25% less than a usual support ring. This is related to the weight reduction of the embodiment of FIGS. 1 to 6. Also shown in FIG. 33 is the upper part of body 12 and the shoulder 14 of the preform 10.

As noted above the preforms preferably are polyester preforms. Useful polyesters include polyethylene terephthalate and polyethylene naphthalate. Other blow moldable resins also can be used but the polyester resins usually have a lower cost and blow molding equipment is readily available for processing polyester performs to containers.

I claim:

1. A thermoplastic preform for the production of thermoplastic containers comprising an elongated thermoplastic body having an open end and a closed end, the open end having an opening defined by a sidewall of the thermoplastic body, threads on an exterior surface of the sidewall adjacent the open end, a support ring located below the threads, the support ring being discontinuous and extending outwardly a distance from the sidewall, and having a varied thickness.

2. A thermoplastic preform for the production of thermoplastic containers as in claim 1 wherein the support ring has void regions.

3. A thermoplastic preform for the production of thermoplastic containers as in claim 1 wherein the support ring has reinforcing segments on a lower surface.

4. A thermoplastic preform for the production of thermoplastic containers as in claim 3 wherein the reinforcing segments comprise lettering.

5. A thermoplastic preform for the production of thermoplastic containers as in claim 1 wherein the support ring has reinforcing segments on an upper surface.

6. A thermoplastic preform for the production of thermoplastic containers as in claim 5 wherein the reinforcing segments comprise lettering.

7. A thermoplastic preform for the production of thermoplastic containers as in claim 1 wherein the elongated thermoplastic body is cylindrical.

8. A thermoplastic preform for the production of thermoplastic containers as in claim 7 wherein the thermoplastic body has a circular cross-section.

9. A thermoplastic preform for the production of thermoplastic containers as in claim 1 wherein the threads are for the attachment of a closure to a container formed from the preform.

10. A thermoplastic preform for the production of thermoplastic containers as in claim 1 wherein the thermoplastic preform is comprised of a polyester.

11. A thermoplastic preform for the production of thermoplastic containers as in claim 10 wherein the polyester is a polyethylene terephthalate.

12. A thermoplastic preform for the production of thermoplastic containers as in claim 4 in which the lettering is molded into the support ring.

13. A thermoplastic preform for the production of thermoplastic containers as in claim 12 in which the lettering comprises advertising indicia.

14. A thermoplastic preform for the production of thermoplastic containers comprising an elongated thermoplastic body having an open end and a closed end, the open end having an opening defined by a sidewall of the thermoplastic body, threads on the sidewall adjacent the open end, a support ring located below the threads, the support ring extending outwardly a distance from the sidewall and having a support surface, the support surface configured to minimize the amount of thermoplastic material used to form the support ring and including one or more of a plurality of void spaces or reinforcing symbols or characters provided in the support surface, and a plurality of reinforcing supports attached to the support surface, said plurality of void spaces, reinforcing supports, and reinforcing symbols or characters being spaced around the entire circumference of the support ring.

15. The thermoplastic preform of claim 14 in which the support ring additionally comprises a lower surface, and a plurality of uniformly spaced apart reinforcing supports are attached to the lower surface.

16. The thermoplastic preform of claim 14 in which the support ring additionally comprises a lower surface, and a plurality of uniformly spaced reinforcing symbols or characters provided in said lower surface.

17. The thermoplastic preform of claim 14 in which the support ring additionally comprises a lower surface, and a plurality of void spaces uniformly spaced apart in said lower surface.

18. The thermoplastic preform of claim 17 in which the void spaces include a mix of differently shaped void spaces.

19. The thermoplastic preform of claim 14 in which the support ring includes an outer surface and at least one void space is provided in the outer surface forming two attached disc sections.

20. A thermoplastic preform for the production of thermoplastic containers comprising an elongated thermoplastic body having an open end and a closed end, the open end having an opening defined by a sidewall of the thermoplastic body, threads on an exterior surface of the sidewall adjacent the open end, a support ring located below the threads, the support ring extending outwardly a distance from the sidewall and being discontinuous.

* * * * *